(12) United States Patent
Mine et al.

(10) Patent No.: US 8,504,780 B2
(45) Date of Patent: Aug. 6, 2013

(54) COMPUTER, COMPUTER SYSTEM, AND DATA COMMUNICATION METHOD

(75) Inventors: Hiroshi Mine, Yokohama (JP); Ken Nomura, Yokohama (JP); Damien Le Moal, Machida (JP); Tadashi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 56 days.

(21) Appl. No.: 13/127,071

(22) PCT Filed: Apr. 8, 2011

(86) PCT No.: PCT/JP2011/002107
§ 371 (c)(1),
(2), (4) Date: May 2, 2011

(87) PCT Pub. No.: WO2012/137265
PCT Pub. Date: Oct. 11, 2012

(65) Prior Publication Data
US 2012/0260017 A1    Oct. 11, 2012

(51) Int. Cl.
*G06F 12/00*    (2006.01)

(52) U.S. Cl.
USPC ............... 711/147; 710/8; 710/15; 710/20; 710/22; 710/48; 710/52; 710/58; 711/111; 711/150; 711/151; 711/154

(58) Field of Classification Search
USPC ......... 710/8, 15, 20, 22, 48, 52, 58; 711/111, 711/147, 150, 151, 154
See application file for complete search history.

(56) References Cited

U.S. PATENT DOCUMENTS

| | | | |
|---|---|---|---|
| 5,123,094 A | 6/1992 | MacDougall | |
| 5,860,026 A * | 1/1999 | Kitta et al. | ...................... 710/33 |
| 7,058,738 B2 | 6/2006 | Stufflebeam, Jr. | |
| 2004/0261075 A1 | 12/2004 | Yang | |
| 2008/0005794 A1 * | 1/2008 | Inoue et al. | ...................... 726/22 |
| 2009/0313391 A1 | 12/2009 | Watanabe | |
| 2010/0325329 A1 | 12/2010 | Sakai | |

FOREIGN PATENT DOCUMENTS

| | | |
|---|---|---|
| JP | 2009-301162 A | 12/2009 |
| JP | 2010-165022 A | 7/2010 |

* cited by examiner

*Primary Examiner* — Idriss N Alrobaye
*Assistant Examiner* — Jasjit Vidwan
(74) *Attorney, Agent, or Firm* — Mattingly & Malur, PC

(57) ABSTRACT

A computer includes first and second processors, first and second I/O devices, a shared memory, and an interrupt controller. The first processor issues a control command for causing the first I/O device to read target data from the first apparatus and store the target data in the shared memory. The first I/O device reads the target data from the first apparatus and, transfers the target data to the shared memory, and generates an I/O complete interrupt. The interrupt controller delivers the generated I/O complete interrupt to the second processor. When the second processor receives the I/O complete interrupt, the second processor issues a control command for causing the second I/O device to read the target data from the shared memory and send the target data to the second apparatus. The second I/O device reads the target data from the shared memory and sends the target data to the second apparatus.

8 Claims, 14 Drawing Sheets

COMPUTER, COMPUTER SYSTEM, AND DATA COMMUNICATION METHOD

TECHNICAL FIELD

The present invention relates to technology of data communication between a plurality of OSs (Operating Systems) to be executed by a plurality of processors in the same computer.

BACKGROUND ART

Shared memory computers comprising a plurality of CPUs (Central Processing Units) and which share physical memories between CPUs are being widely used. Pursuant to the improvement in the storage density of memories resulting from the advancement in semiconductor technology and the emergence of multi-core processors comprising a plurality of processor cores on the same processor chip, the memory capacity and number of CPUs that can be mounted on a single computer are increasing. In this kind of computer, technology for running a plurality of different OSs on the same computer has been put into practical application.

When running a plurality of different OSs on the same computer, resources such as the CPU, memory, and I/O (Input/Output) device of the computer are shared between OSs or logically divided and occupied by one OS based on technologies such as virtualization and logical partitioning. Examples of an I/O device include, for example, an HBA (Host Bus Adapter) for coupling the computer to a storage apparatus, and an NIC (Network Interface Card) for coupling the computer to a network. Patent Literature 1 discloses technology for coupling these I/O devices to a plurality of CPUs in the same computer. Moreover, Patent Literature 2 discloses technology for sharing, among a plurality of virtual computers in a plurality of physical computers, an I/O device corresponding to the SR-IOV (Single Root I/O Virtualization) standard which has been standardized by PCI-SIG (PCI Special Interest Group).

As the communication methods between OSs running on the same computer, in addition to the method of performing communication via an I/O device as with the case where the respective OSs are running on independent computers, there is the method of performing communication via a physical memory area of the shared memory which can be shared and used between OSs. Furthermore, in cases where the respective OSs are occupying and using a CPU, there is also the method of performing communication by using an inter-processor interrupt from the CPU which is executing the OS of the communication source to the CPU which is executing the OS of the communication destination. Patent Literature 3 discloses technology of performing inter-processor communication by using a shared memory and socket communication.

CITATION LIST

Patent Literature

[PTL (Patent Literature) 1]
  U.S. Pat. No. 7,058,738
[PTL 2]
  Japanese Patent Application Laid-open No. 2009-301162
[PTL 3]
  Japanese Patent Application Laid-open No. 2010-165022

SUMMARY OF INVENTION

Technical Problem

With the conventional communication methods, among a plurality of OSs running on respectively different CPUs in the same computer, if an OS (first OS) running on one CPU is to deliver data, which was read by the first OS from the I/O device, to an OS (second OS) running on another CPU, the CPU executing the first OS needs to copy the data to be delivered in the shared memory, and there is a problem in that data copy processing will become overloaded.

Moreover, with the conventional communication methods, socket communication between OSs is used for notifying the completion of writing of data into the shared memory and the completion of reading of data from the shared memory, and there is a problem in that the socket communication processing becomes overloaded and the processing becomes delayed during the period from the time that writing of data by the first OS into the shared memory is complete to the time that the reading of data by the second OS is enabled, and during the period from the time that reading of data by the second OS from the shared memory is complete to the time that the shared memory, which was used for the delivery of data by the first OS, can be used again.

The present invention was devised in view of the foregoing problems. Thus, an object of this invention is to provide technology which enables high-speed and highly-efficient data communication, by using a shared memory, between a plurality of OSs running on different CPUs in the same computer.

Solution to Problem

In order to achieve the foregoing object, the computer according to one aspect of the present invention comprises a first processor for executing a first OS, a first I/O device capable of inputting and outputting data to and from a first apparatus based on control of the first processor which executes the first OS, a second processor for executing a second OS, a second I/O device capable of inputting and outputting data to and from a second apparatus based on control of the second processor which executes the second OS, a shared memory which is accessible by the first and second processors, and an interrupt controller for controlling the sending of an I/O complete interrupt to the first processor or the second processor. The first processor issues a control command for causing the first I/O device to read, from the first apparatus, target data to be sent to the second apparatus and store the target data in the shared memory. Based on the control command, the first I/O device reads the target data from the first apparatus and thereafter transfers the target data to the shared memory, and additionally generates an I/O complete interrupt. The interrupt controller delivers the I/O complete interrupt generated by the first I/O device to the second processor. When the second processor receives the I/O complete interrupt, the second processor issues a control command for causing the second I/O device to read the target data from the shared memory and send the target data to the second apparatus. Based on the control command, the second I/O device reads the target data from the shared memory and sends the target data to the second apparatus.

DESCRIPTION OF EMBODIMENTS

Figure 1:
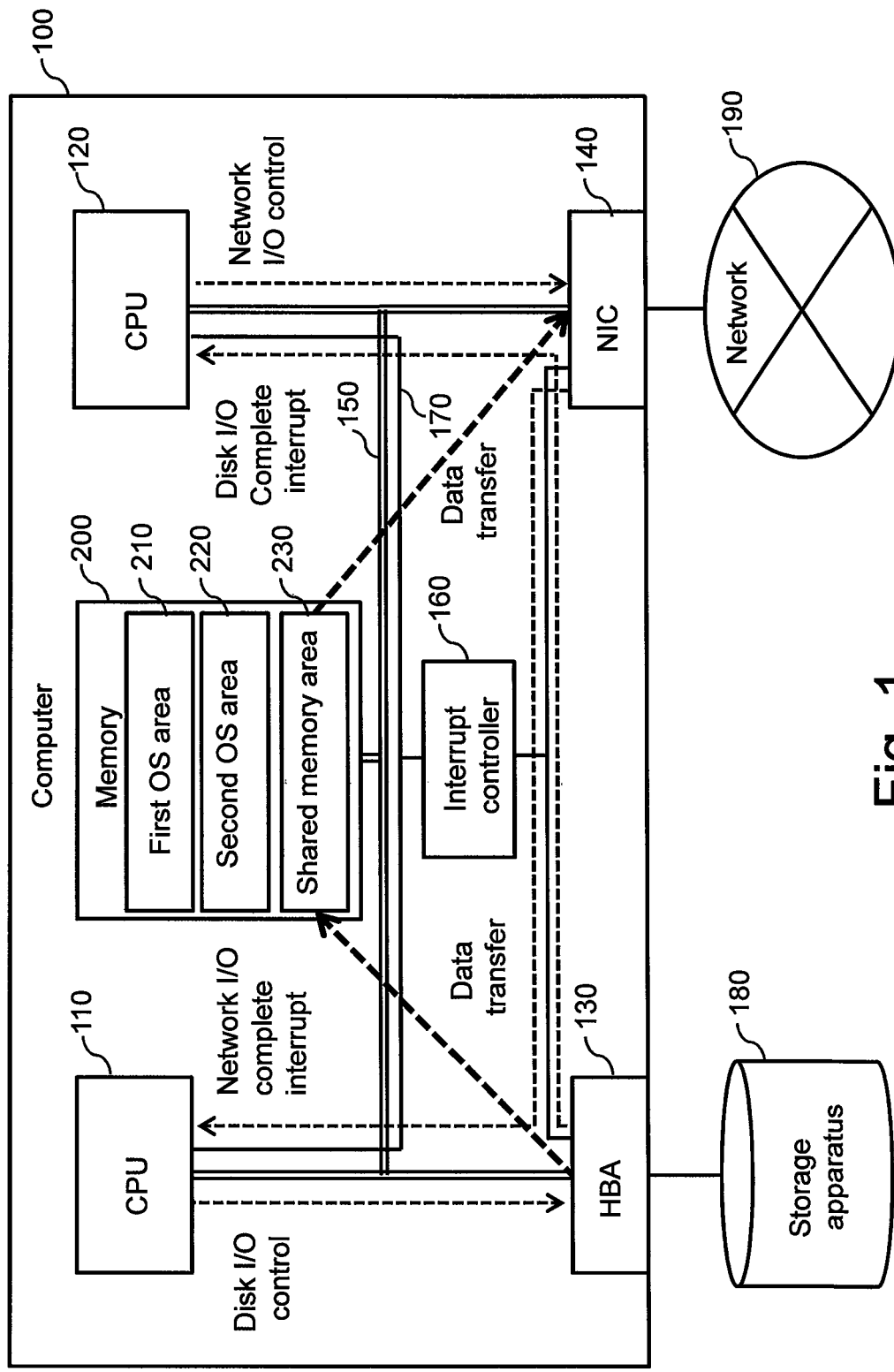
FIG. 1 is a diagram showing a configuration example of the computer system of the first embodiment.

Embodiments of the present invention are now explained with reference to the appended drawings. Note that the same configuration in the respective diagrams is given the same reference numeral.

Moreover, there are cases in the ensuing explanation where processing is described using a program such as an "OS" or "function module" as the subject, and since a program performs predetermined processing by using a storage resource (for instance, a memory) and/or a communication interface device (for instance, a communication port) by being executed by a processor (for instance, a CPU (Central Processing Unit)) included in a computer, the term "processor" may also be used as the subject of the processing. Processing that is explained with the term "program" as the subject may be processing to be performed by a processor or a computer comprising such processor. A program may be installed into the respective controllers from a program source. A program source may be, for example, a program distribution server or a storage media.

Example 1

FIG. 1 is a diagram showing a configuration example of the computer system of the first embodiment.

The computer system includes a computer 100, a storage apparatus 180 as an example of a first apparatus, and a network 190. The computer system provides, for example, a data distribution service where the computer 100 reads video data from the storage apparatus 180 and distributes the read video data to the network 190 (specifically, to an external apparatus such as a computer coupled to a network). Specifically, the computer system provides, for example, video streaming distribution or HTTP (Hypertext Transfer Protocol) distribution services. Note that, in FIG. 1, constituent elements such as a keyboard, mouse and power supply unit which are not directly related to the explanation of this embodiment have been omitted.

The computer 100 includes a CPU 110 as an example of a first processor, a CPU 120 as an example of a second processor, a memory 200 as an example of a shared memory, an interrupt controller 160, an HBA 130 as an example of a first I/O device, and an NIC 140 as an example of a second I/O device. The CPU 110, the CPU 120, the memory 200, the HBA 130, and the NIC 140 are mutually coupled via a data bus 150. Moreover, the CPU 110 and the CPU 120, and the HBA 130 and the NIC 140 are coupled with an interrupt signal bus 170 via an interrupt controller 160.

The memory 200 is the main storage apparatus of the computer 100, and is configured, for example, from a DRAM (Dynamic Random Access Memory) or an SRAM (Static Random Access Memory). The memory 200 is internally provided with a first OS area 210 to be used by a first OS (CPU to execute the first OS) and a second OS area 220 to be used by a second OS (CPU to execute the second OS) which are executed on the computer 100, and a shared memory area 230 to be shared and used by the first OS (CPU to execute the first OS) and the second OS (CPU to execute the second OS).

The CPU 110 executes the first OS. Specifically, the CPU 110 accesses the memory 200 and executes the programs of the first OS stored in the first OS area 210. The CPU 110 which executes the first OS controls the HBA 130 according to the first OS. Similarly, the CPU 120 executes the second OS and controls the NIC 140 according to the second OS. Note that the CPU 110 and the CPU 120 may be processors with independent chips or different processing cores on the same chip as with a multi-core processor. Moreover, as the OS to be used as the first OS to be executed by the CPU 110 and the OS to be used as the second OS to be executed by the CPU 120, for example, these may be different types of OSs such as the first OS being a real-time OS and the second OS being a general purpose OS, or these may be the same OS such as both being a real-time OS or both being a general purpose OS.

The HBA 130 is an I/O device which couples the computer 100 and the storage apparatus 180, and, for example, is an interface card corresponding to SCSI (Small Computer System Interface), SAS (Serial Attached SCSI), or FC (Fibre Channel). The HBA 130 is controlled by the CPU 110 which executes the first OS, and controls the disk I/O access by the computer 100 to the storage apparatus 180. For example, the HBA 130 reads, into the HBA 130, data in the storage apparatus 180 designated by the first OS. The HBA 130 DMA (Direct Memory Access) transfers the read data to the shared memory area 230 in the memory 200 via the data bus 150, and, when the transfer is complete, generates a disk I/O complete interrupt (I/O complete interrupt), and delivers this to the interrupt controller 160. In this embodiment, the disk I/O complete interrupt generated by the HBA 130 is delivered, via the interrupt controller 160, to the CPU 120 which executes the second OS.

The NIC 140 is an I/O device which couples the computer 100 and the network 190 (external apparatus coupled to the network 190), and, for example, is an interface card corresponding to Ethernet (registered trademark), InfiniBand, or Myrinet. In this embodiment, the NIC 140 is controlled by the CPU 120 which executes the second OS, and controls the network I/O access by the computer 100 to the network 190. For example, the NIC 140 DMA-transfers to itself, via the data bus 150, data in the shared memory area 230 of the memory 200 designated by the CPU 120 which executes the second OS, and, when the transfer is complete, generates a network I/O complete interrupt (I/O complete interrupt), and sends this to the interrupt controller 160. The NIC 140 sends that data that was transferred to itself to the network 190 (external apparatus (second apparatus) coupled to the network). The network I/O complete interrupt generated by the NIC 140 is delivered, via the interrupt controller 160, to the CPU 110 which executes the first OS.

The interrupt controller 160 is a device which controls the delivery of the I/O interrupt (disk I/O complete interrupt, network I/O complete interrupt and so on) in the computer 100, and, for example, is an APIC (Advanced Programmable Interrupt Controller). The interrupt controller 160 is controlled by the CPU 110 which executes the first OS and the CPU 120 which executes the second OS. The interrupt controller 160 delivers to the CPU 110 and the CPU 120, via the interrupt signal bus 170, the I/O interrupt generated by the I/O device of the HBA 130, the NIC 140 and so on. Moreover, the interrupt controller 160 controls an IPI (Inter-Processor Interrupt), which is an interrupt between the CPU 110 and the CPU 120. Note that the interrupt controller 160 may also be configured by being separated into a local APIC existing on the same chip as the CPU 110 or the CPU 120, and an I/O APIC existing on the main board.

The storage apparatus 180 is an auxiliary storage apparatus of the computer 100, and, for example, is an HDD (Hard Disk Drive), an SSD (Solid State Drive), or a RAID (Redundant Arrays of Inexpensive/Independent Disks) apparatus comprising a plurality of HDDs and/or SSDs. The storage apparatus 180 stores programs files of the first OS and the second OS to be executed in the computer 100, data (target data; for example, video data files) to be distributed by the computer 100 to the network 190, and so on.

The network 190 is, for example, a LAN (Local Area Network) or a WAN (Wide Area Network), and couples the computer 100 and one or more external apparatuses (computers or the like: second apparatuses) to receive the data sent by the computer 100.

Figure 2:
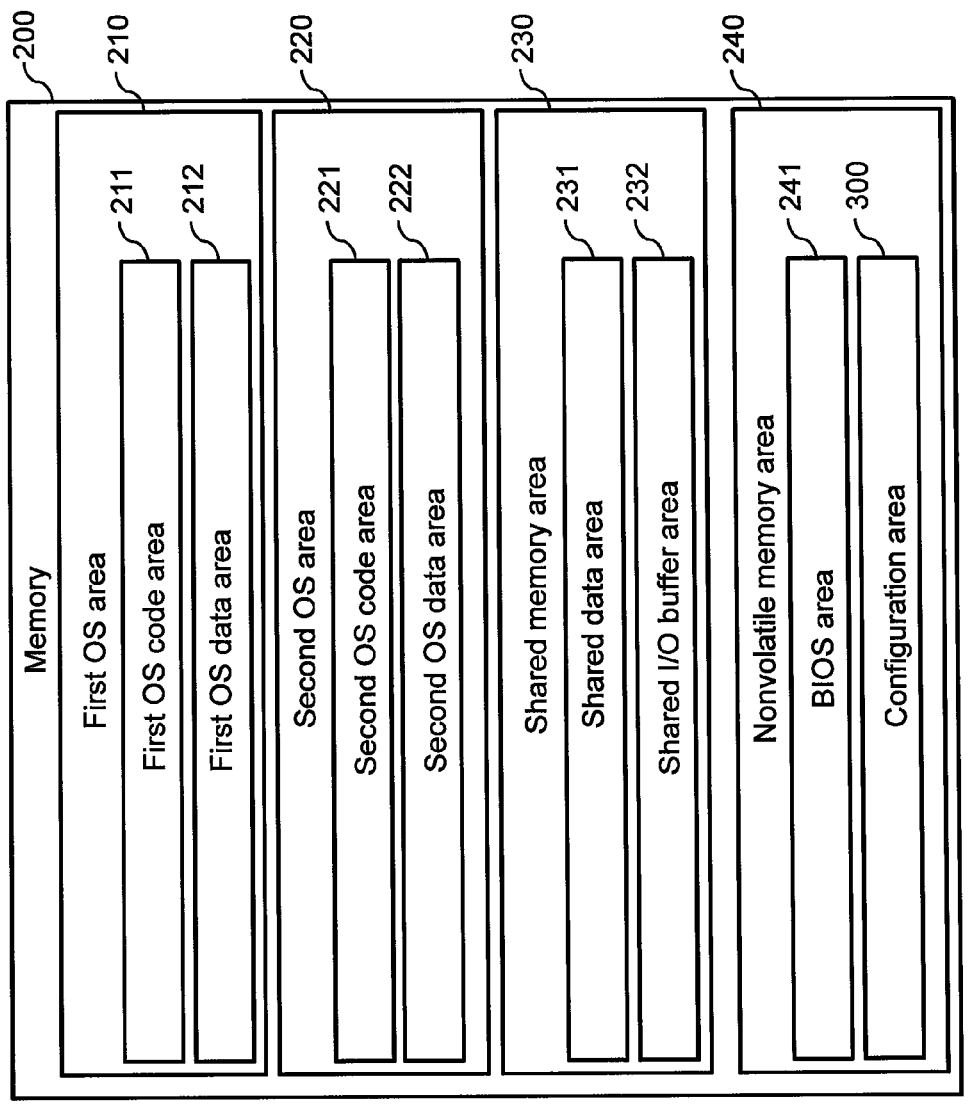
FIG. 2 is a diagram explaining the contents of the memory of the first embodiment.

FIG. 2 is a diagram explaining the contents of the memory of the first embodiment.

The memory 200 includes a first OS area 210, a second OS area 220, a shared memory area 230, and a nonvolatile memory area 240.

The first OS area 210 is an area that is used by the CPU 110 which executes the first OS, and includes a first OS code area 211 and a first OS data area 212. The CPU 110 executes the command sequence; that is, programs of the first OS, stored in the first OS code area 211, and performs computation and control by using the first OS data area 212. Similarly, the second OS area 220 includes a second OS code area 221 and a second OS data area 222. The CPU 120 executes a command sequence; that is, programs of the second OS, stored in the second OS code area 221, and performs computation and control by using the second OS data area 222.

The shared memory area 230 is an area to be shared and used by the CPU 110 which executes the first OS and the CPU 120 which executes the second OS, and includes a shared data area 231 and a shared I/O buffer area 232. The shared data area 231 stores data to be shared by the CPU 110 which executes the first OS and the CPU 120 which executes the second OS; for example, a data area used in the conventional inter-OS communication method, lock information used for the exclusive control between OSs, and the like. The shared I/O buffer area 232 is used by the CPU 110 which executes the first OS and the CPU 120 which executes the second OS for transferring data via the HBA 130 and the NIC 140. The HBA 130 DMA-transfers the data read from the storage apparatus 180 to an area of the shared I/O buffer area 232 designated by the CPU 110 which executes the first OS. The NIC 140 DMA-transfers the data stored in the area of the shared buffer area 232 designated by the CPU 120 which executes the second OS, and sends this to the network 190.

The nonvolatile memory area 240 is configured, for example, from a nonvolatile memory such as an SRAM or EEPROM (Electrically Erasable Programmable Read Only Memory), or from a DRAM with battery backup, and stores data so that it is not volatilized even with the computer 100 in a shutdown state. The nonvolatile memory area 240 includes a BIOS area 241 for storing a BIOS (Basic Input/Output System) program code, and a configuration area 300 for storing configuration control information of the computer 100. When the computer 100 is booted, the CPU 110 executes the command sequence of the BIOS area 241, and initializes the I/O device of the HBA 130, the NIC 140 and so on, and the interrupt controller 160.

Figure 3:
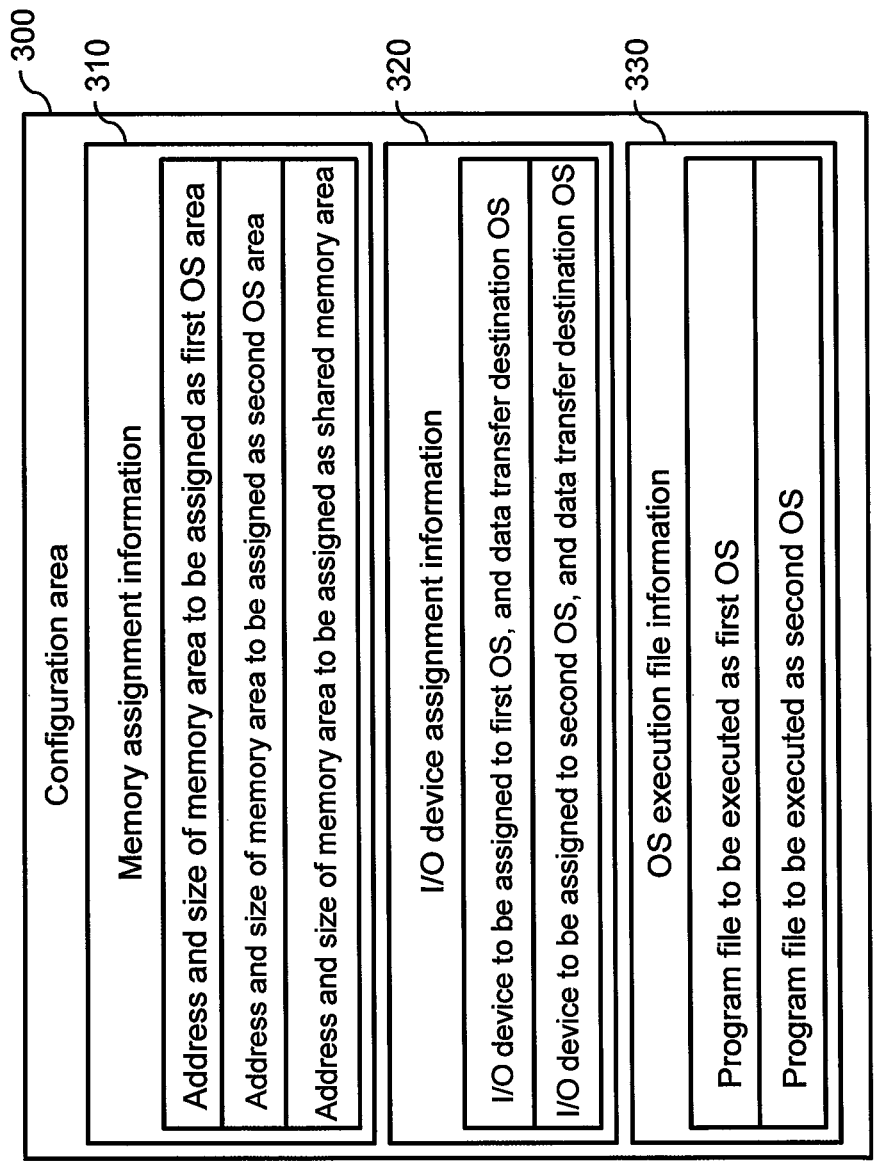
FIG. 3 is a diagram explaining the contents of the configuration area of the first embodiment.

FIG. 3 is a diagram explaining the contents of the configuration area of the first embodiment.

The configuration area 300 stores memory assignment information 310, I/O device assignment information 320, and OS execution file information 330. With respect to the foregoing information, the default values may be written upon factory shipment, or the setting maybe rewritten by operating the configuration control tool, which runs on the first OS, on the CPU 110 after shipment.

The memory assignment information 310 stores information concerning the start address and size of the memory to be assigned to the respective areas in order to use the memory 200 by dividing it into the first OS area 210, the second OS area 220, and the shared memory area 230.

The I/O device assignment information 320 stores information for assigning the I/O device in the computer 100 to the respective OSs. For example, if the first OS (CPU 110 which executes the first OS) is to control the HBA 130 and transfer the data read from the storage apparatus 180 to the CPU 120 which executes the second OS, the ID of the HBA 130 as the I/O device to be assigned to the CPU 110 which controls the first OS and the ID of the CPU 120 which executes the second OS as the data transfer destination OS are stored. Note that, as the ID of the I/O device, for example, a set of the bus number, device number, and function number of the coupled device may be used if the I/O device is a PCI (Peripheral Component Interconnect) device, and an APIC ID may be used as the ID of the CPU.

The OS execution file information 330 stores information concerning the storage location of the program files of the OS to be executed as the first OS on the CPU 110, and the program files of the second OS to be executed as the second OS on the CPU 120. The program files of the respective OSs may also be stored in the storage apparatus 180, or stored in the nonvolatile memory area 240. Moreover, the program files of the respective OSs may also be separated into a boot loader file, a kernel file, a kernel module file, an application program file, a configuration file, and so on. In addition, these files may also be stored in a boot server (not shown) coupled with the network 190.

Figure 4:
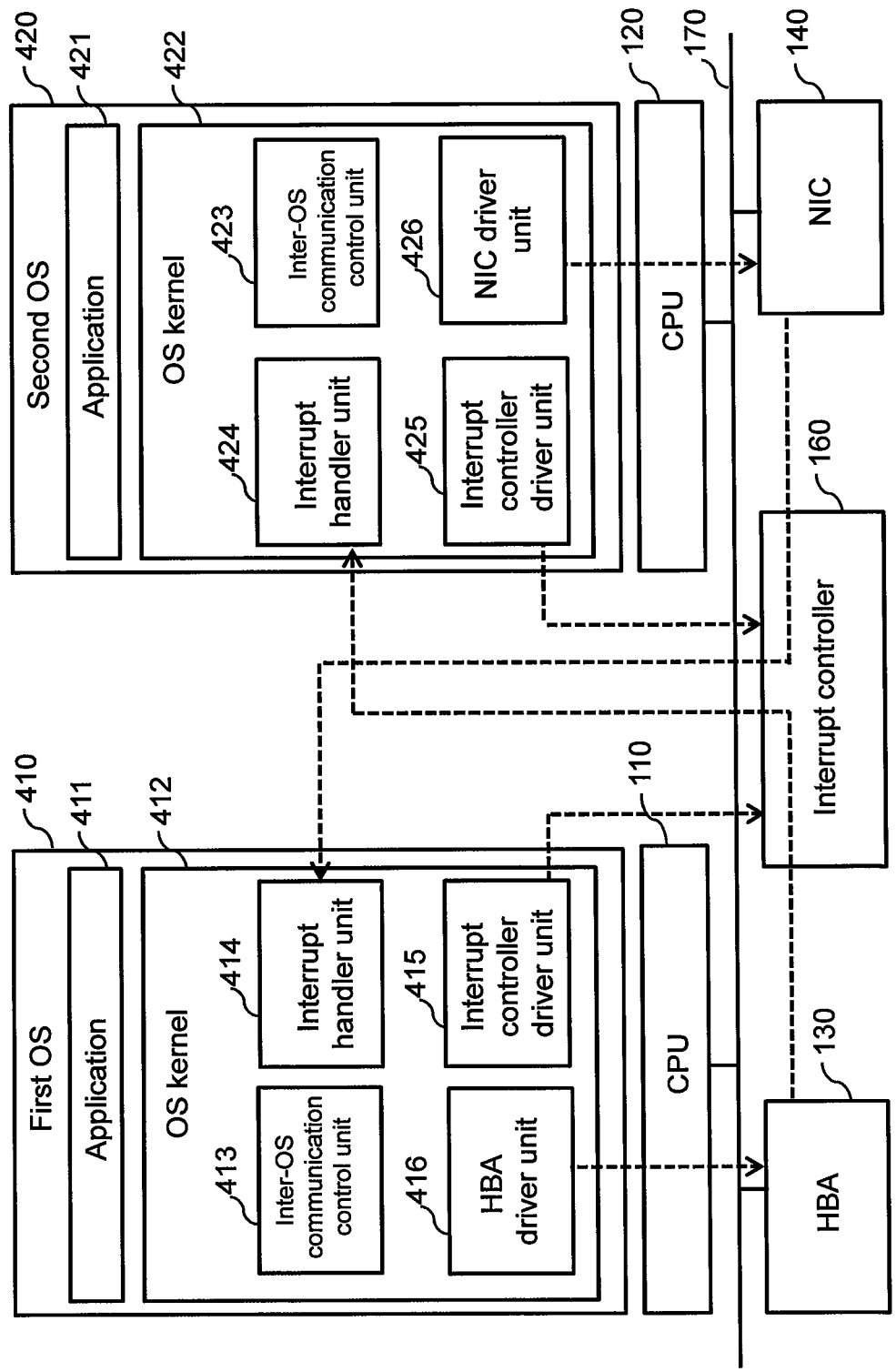
FIG. 4 is a configuration diagram of the function module of the first OS and second OS of the first embodiment.

FIG. 4 is a configuration diagram of the function module of the first OS and second OS of the first embodiment. Note that, in FIG. 4, constituent elements such as a process scheduler unit, a file system unit, and a conventional inter-OS communication control unit which are not directly related to the explanation of this embodiment have been omitted.

A first OS 410 is software that is executed on the CPU 110, and a second OS 420 is software that is executed on the CPU 120.

The first OS 410 includes an application 411 and an OS kernel 412. The OS kernel 412 includes an inter-OS communication control unit 413, an interrupt handler unit 414, an interrupt controller driver unit 415, and an HBA driver unit 416. Similarly, the second OS 420 includes an application 421 and an OS kernel 422, and the OS kernel 422 includes an inter-OS communication control unit 423, an interrupt handler unit 424, an interrupt controller driver unit 425, and an NIC driver unit 426.

The application 411 of the first OS 410 coordinates with the application 421 of the second OS 420 to realize the data distribution service in the computer 100. The application 411 of the first OS 410 and the application 421 of the second OS 420 perform data communication by using the inter-OS data communication function provided by the OS kernel 412 and the OS kernel 422. Note that the applications 411, 421 may also send messages or perform synchronization by using a conventional inter-OS communication function provided by their respective OSs.

The inter-OS communication control unit 413 of the first OS 410 provides the inter-OS data communication function of the OS kernel 412 by controlling the interrupt handler unit 414, the interrupt controller driver unit 415, and the HBA driver unit 416. The interrupt handler unit 414 registers in the CPU 110, as the interrupt handler, the routine to be executed in cases where the CPU 110 receives an interrupt. The interrupt controller driver unit 415 controls the interrupt controller 160. The HBA driver unit 416 controls the HBA 130.

The inter-OS communication control unit 413 sets in the interrupt handler unit 414, based on the I/O device assignment information 320 of the configuration area 300, a routine to be executed as one of the interrupt handler routines in cases when an I/O interrupt by the NIC 140 is received. Moreover, the inter-OS communication control unit 413 controls the interrupt controller 160 via the interrupt controller driver unit 415, and configures a setting so that the I/O complete interrupt by the HBA 130 is delivered to the CPU 120 which executes the second OS 420. Moreover, the inter-OS communication control unit 413 controls the HBA 130 via the HBA driver unit 416, and configures a setting so that the HBA 130 can be used in the first OS 410.

Similarly, the inter-OS communication control unit 423 of the second OS 420 provides the inter-OS data communication function of the OS kernel 422 by controlling the interrupt handler unit 424, the interrupt controller driver unit 425, and the NIC driver unit 426. The interrupt handler unit 424 registers in the CPU 120, as the interrupt handler, the routine to be executed in cases where the CPU 120 receives an interrupt. The interrupt controller driver unit 425 controls the interrupt controller 160. The NIC driver unit 426 controls the NIC 140.

The inter-OS communication control unit 423 sets in the interrupt handler unit 424, based on the I/O device assignment information 320 of the configuration area 300, a routine to be executed as one of the interrupt handler routines in cases when an I/O interrupt by the HBA 130 is received. Moreover, the inter-OS communication control unit 423 controls the interrupt controller 160 via the interrupt controller driver unit 425, and configures a setting so that the I/O complete interrupt by the NIC 140 is delivered to the CPU 110 which executes the first OS 410. Moreover, the inter-OS communication control unit 423 controls the NIC 140 via the NIC driver unit 426, and configures a setting so that the NIC 140 can be used in the second OS 420.

Figure 5:
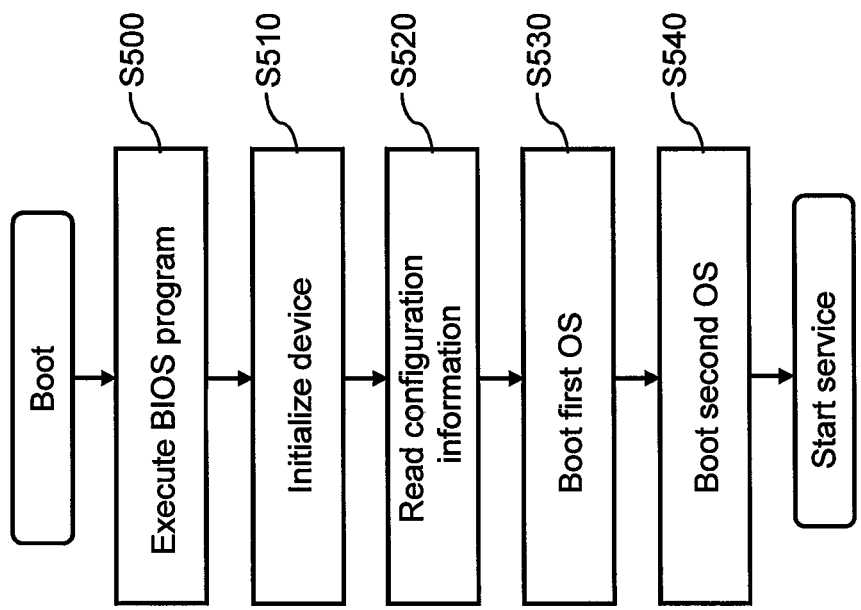
FIG. 5 is a flowchart rendering the boot processing of the computer of the first embodiment.

FIG. 5 is a flowchart rendering the boot processing of the computer of the first embodiment.

When the computer 100 is booted by its power being turned on, it foremost executes the command sequence, that is, the BIOS program, of the BIOS area 241 of the memory 200, on the CPU 110 (step S500). Subsequently, the CPU 110 initializes the I/O device of the HBA 130, the NIC 140, and so on, and the interrupt controller 160 according to the BIOS program (step S510).

Subsequently, the CPU 110 reads the configuration information stored in the configuration area 300 according to the BIOS program (step S520). Subsequently, the CPU 110 boots the first OS 410 by deploying, in the first OS area 210 designated in the memory assignment information 310, the program file to be executed as the first OS designated in the OS execution file information 330 according to the BIOS program, and executing the command sequence stored in the first OS code area 211 (step S530). Here, if the program file is stored in the storage apparatus 180, the CPU 110 accesses the storage apparatus 180 via the HBA 130 and acquires the program file, and, if the program file is stored in the boot server coupled to the network 190, the CPU 110 accesses the boot server via the NIC 140 and acquires the program file by using, for example, the PXE (Preboot Execution Environment) function.

Subsequently, the CPU 110 deploys, in the second OS area 220 designated in the memory assignment information 310, the program file to be executed as the second OS designated in the OS execution file information 330 according to the program of the first OS 410. The CPU 110 thereby boots the second OS 420 on the CPU 120 by causing the CPU 120 to execute the command sequence stored in the second OS code area 221 (step S540).

Based on the foregoing processing, the CPU 110 executes the first OS 410 and the CPU 120 executes the second OS 420, and the computer 100 enters a state of being able to commence its service.

Note that, in the foregoing processing, a case is explained where the first OS 410 that is booted first on the CPU 110 based on the BIOS program causes the CPU 120 to execute the second OS 420, but the first OS 410 and the second OS 420 may be executed in parallel by the CPU 110 and the CPU 120 according to the BIOS program.

Figure 6:
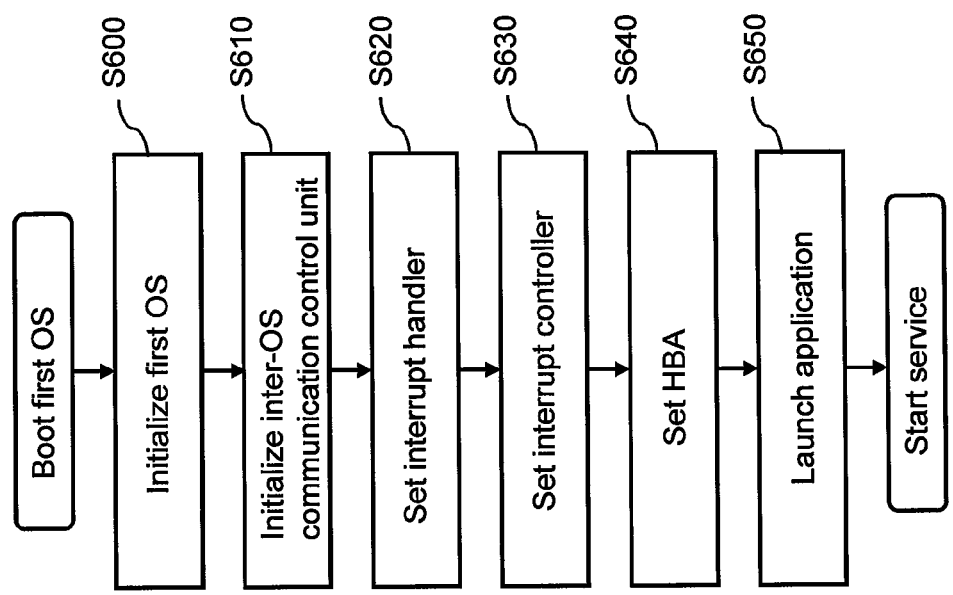
FIG. 6 is a flowchart rendering the service start processing of the first OS of the first embodiment.

FIG. 6 is a flowchart rendering the service start processing of the first OS of the first embodiment.

The CPU 110 which executes the first OS 410 foremost initializes the first OS 410 (step S600). Here, the process scheduler unit, the file system unit and the like of the OS kernel 412 of the first OS 410 are initialized. Moreover, when the first OS 410 is to boot the second OS 420, it boots the second OS 420 on the CPU 120.

Subsequently, the first OS 410 initializes the inter-OS communication control unit 413 (step S610). Here, the first OS 410 configures the inter-OS communication control unit 413 as one of the tasks of the OS kernel 412, and the following processing is executed as a task of the inter-OS communication control unit 413.

Subsequently, the inter-OS communication control unit 413 sets in the interrupt handler unit 414, as the interrupt handler, the routine of processing the I/O interrupt received by the first OS 410 from the NIC 140 controlled by the second OS 420 based on the I/O device assignment information 320 (step S620).

Subsequently, the inter-OS communication control unit 413 controls the interrupt controller 160 via the interrupt controller driver unit 415 based on the I/O device assignment information 320, and configures a setting so that the I/O complete interrupt by the HBA 130 is delivered to the CPU 120 which executes the second OS 420 (step S630).

Subsequently, the inter-OS communication control unit 413 controls the HBA 130 via the HBA driver unit 416, and configures a setting so that the HBA 130 can be used in the first OS 410 (step S640).

When the preparation for providing the inter-OS data communication function of the OS kernel 412 by the inter-OS communication control unit 413 is completed based on the foregoing processing, the first OS 410 boots the application program to be executed as the application 411 as one of the processes (step S650). The application 411 synchronizes with the application 421 that is booted on the second OS 420 by using a conventional inter-OS communication function, and starts providing the service.

Figure 7:
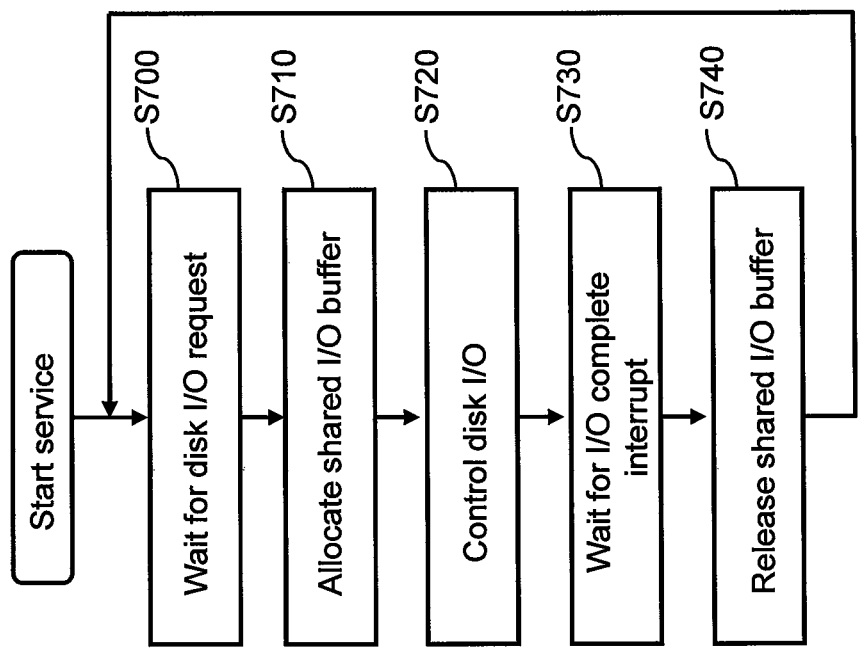
FIG. 7 is a flowchart rendering the operation processing of the inter-OS communication control unit of the first OS of the first embodiment.

FIG. 7 is a flowchart rendering the operation processing of the inter-OS communication control unit of the first OS of the first embodiment.

The inter-OS communication control unit 413 foremost waits for a disk I/O request from the application 411 (step S700). Here, the inter-OS communication control unit 413 may wait for a disk I/O request event from the application 411 in a sleep mode, or based on periodic polling. The disk I/O request includes, for example, the LBA (Logical Block Address) and the size of the data showing the location of the data in the storage apparatus 180.

Upon receiving the disk I/O request, the inter-OS communication control unit 413 allocates a part of the memory area of the shared I/O buffer area 232 as the I/O buffer to be used in the data transfer from the HBA 130 (step S710). Here, the usage of the shared I/O buffer area 232 can be managed by using a bitmap corresponding to the partial memory area of the shared I/O buffer area 232 within the shared data area 231. The first OS 410 may notify the address of the allocated area to the second OS 420 by using a conventional inter-OS communication function, or decide the plurality of areas to be used in advance between the first and second OSs such as with a ring buffer, and uses these areas in order.

Subsequently, the inter-OS communication control unit 413 controls the disk I/O of the HBA 130, via the HBA driver unit 416, so that it reads the data in the storage apparatus 180 designated in the disk I/O request, and DMA-transfers the read data to the memory area allocated in the shared I/O buffer area 232 (step S720). Here, when the disk I/O is complete, the I/O complete interrupt generated by the HBA 130 is delivered, via the interrupt controller 160, to the CPU 120 which executes the second OS 420.

Subsequently, the inter-OS communication control unit 413 waits for the interrupt handler unit 414 to receive the I/O complete interrupt that is delivered from NIC 140 via the interrupt controller 160 (step S730).

Upon receiving the I/O complete interrupt, the inter-OS communication control unit 413 releases the allocated memory area of the shared I/O buffer area 232 (step S740). When the memory area release processing is complete, the inter-OS communication control unit 413 returns to the disk I/O request wait processing (step S700) from the application 411.

Figure 8:
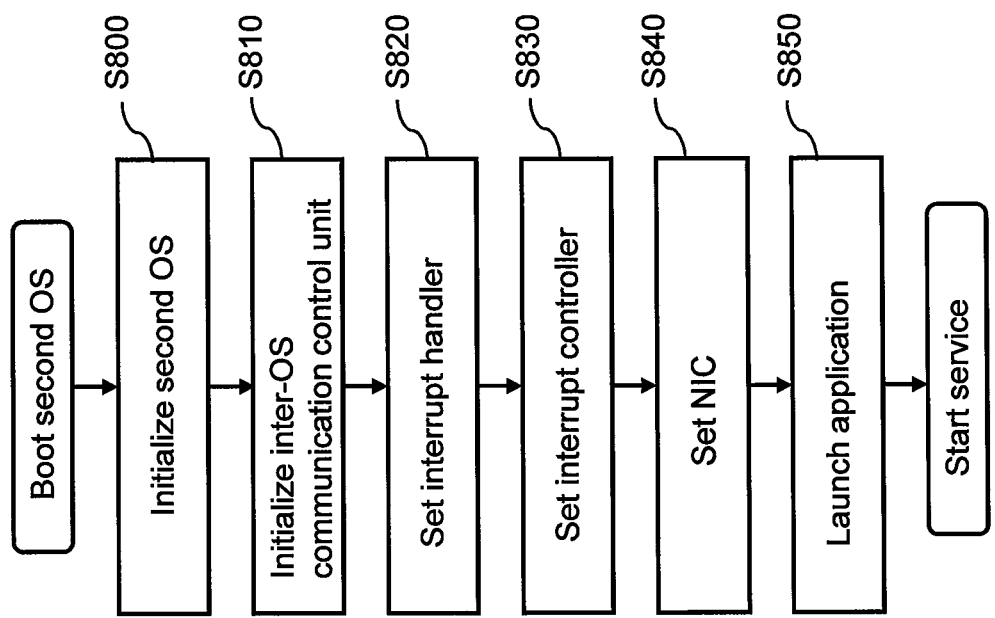
FIG. 8 is a flowchart rendering the service start processing of the second OS of the first embodiment.

FIG. 8 is a flowchart rendering the service start processing of the second OS of the first embodiment.

The CPU 120 which executes the second OS 420 foremost initializes the second OS 420 (step S800). Here, the process scheduler unit, the file system unit and the like of the OS kernel 422 of the second OS 420 are initialized.

Subsequently, the second OS 420 initializes the inter-OS communication control unit 423 (step S810). Here, the second OS 420 configures the inter-OS communication control unit 423 as one of the tasks of the OS kernel 422, and the following processing is executed as a task of the inter-OS communication control unit 423.

Subsequently, the inter-OS communication control unit 423 sets in the interrupt handler unit 424, as the interrupt handler, the routine of processing the I/O interrupt received by the second OS 420 from the HBA 130 controlled by the first OS 410 via the interrupt controller 160 based on the I/O device assignment information 320 (step S820).

Subsequently, the inter-OS communication control unit 423 controls the interrupt controller 160 via the interrupt controller driver unit 425 based on the I/O device assignment information 320, and configures a setting so that the I/O complete interrupt by the NIC 140 is delivered to the CPU 110 which executes the first OS 410 (step S830).

Subsequently, the inter-OS communication control unit 423 controls the NIC 140 via the NIC driver unit 426, and configures a setting so that the NIC 140 can be used in the second OS 420 (step S840). When the preparation for providing the inter-OS data communication function of the OS kernel 422 by the inter-OS communication control unit 423 is completed based on the foregoing processing, the second OS 420 boots the application program to be executed as the application 421 as one of the processes (step S850). The application 421 synchronizes with the application 411 that is booted on the first OS 410 by using a conventional inter-OS communication function, and starts providing the service.

Figure 9:
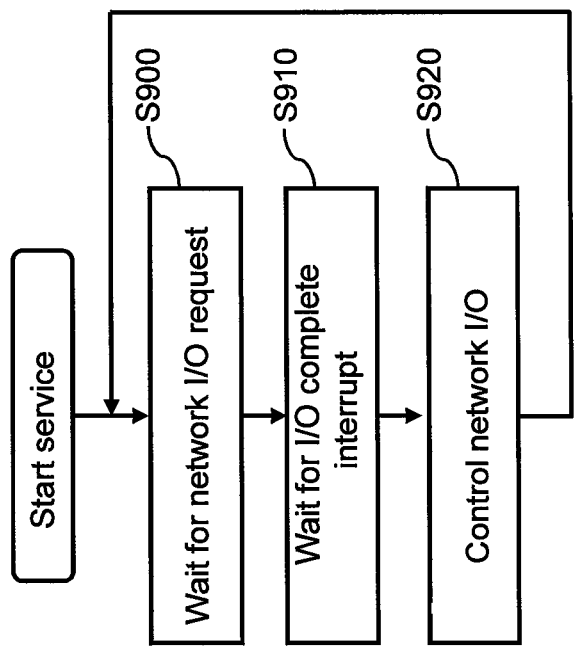
FIG. 9 is a flowchart rendering the operation processing of the inter-OS communication control unit of the second OS of the first embodiment.

FIG. 9 is a flowchart rendering the operation processing of the inter-OS communication control unit of the second OS of the first embodiment.

The inter-OS communication control unit 423 foremost waits for a network I/O request from the application 421 (step S900). The network I/O request includes, for example, an IP (Internet Protocol) address or multicast address showing the destination on the network 190.

Upon receiving the network I/O request, the inter-OS communication control unit 423 waits for the interrupt handler unit 424 to receive the I/O complete interrupt that is delivered from the HBA 130 via the interrupt controller 160 (step S910).

Upon receiving the I/O complete interrupt, the inter-OS communication control unit 423 controls the network I/O of the NIC 140, via the NIC driver unit 426, so that it DMA-transfers the data, which was read by the HBA 130 from the storage apparatus 180 and stored in the shared I/O buffer area 232, and sends it to the designation designated in the network I/O request (step S920). Here, the I/O complete interrupt that is generated by the NIC 140 when the network I/O is complete is delivered, via the interrupt controller 160, to the CPU 110 which executes the first OS 410.

In this embodiment, if data of the shared I/O buffer area 232 is to be sent to the network 190 upon dividing it into a plurality of packets, the inter-OS communication control unit 423 controls the NIC 140 so that it generates the I/O complete interrupt when the sending of the last divided packet is complete.

Moreover, when sending the header information and the like prepared in the second OS data area 222 together with the data of the shared I/O buffer area 232 by using the scatter/gather function of the NIC 140, the routine (interrupt processing routine) corresponding to the I/O complete interrupt of the NIC 140 is set in the interrupt handler unit 424 during the interrupt handler setting processing (step S820), and the interrupt controller 160 is set so that the I/O complete interrupt of the NIC 140 is also delivered to the CPU 120, in addition to the CPU 110, during the interrupt controller setting processing (step S830). Consequently, the interrupt handler unit 424 of the second OS 420 can receive the I/O complete interrupt of the NIC 140, and the memory area that was used for storing the header information and the like of the second OS data area 222 based on the interrupt processing routine can be released.

Based on the foregoing processing, the first OS 410 can read data from the storage apparatus 180 storage apparatus 180 in units of a size that is larger than the packet size sent by the second OS 420, and the disk I/O can be efficiently performed thereby.

When the network I/O control processing (step S920) is complete, the inter-OS communication control unit 423 returns to the network I/O request wait processing (step S900) from the application 421.

As explained above, with the computer system according to the first embodiment of the present invention, when data that was read by the first OS 410 from the storage apparatus 180 via the HBA 130 is to be sent by the second OS 420 to the network 190 via the NIC 140, the processing for writing data into the shared memory area 230 by the CPU 110 which executes the first OS 410 and for reading data from the shared memory area 230 by the CPU 120 which executes the second OS 420 is no longer required, and the load of the data copy processing performed by the CPU 110 and the CPU 120 can be reduced.

Moreover, since the CPU 110 which executes the first OS 410 directly receives the I/O complete interrupt from the NIC 140 and the CPU 120 which executes the second OS 420 directly receives the I/O complete interrupt from the HBA 130, respectively, without going through the CPUs which respectively execute the other OS, the CPU 110 which executes the first OS 410 and the CPU 120 which executes the second OS 420 are no longer required to notify the completion of processing to the shared memory area 230 by using a conventional inter-OS communication means such as socket communication, and the load for notifying the completion of processing and the delay in processing caused thereby can be reduced.

Thus, according to this embodiment, it is to possible to provide technology which enables high-speed and highly-efficient inter-OS data communication, by using a shared memory, between a plurality of OSs running on different CPUs in the same computer.

Example 2

Figure 10:
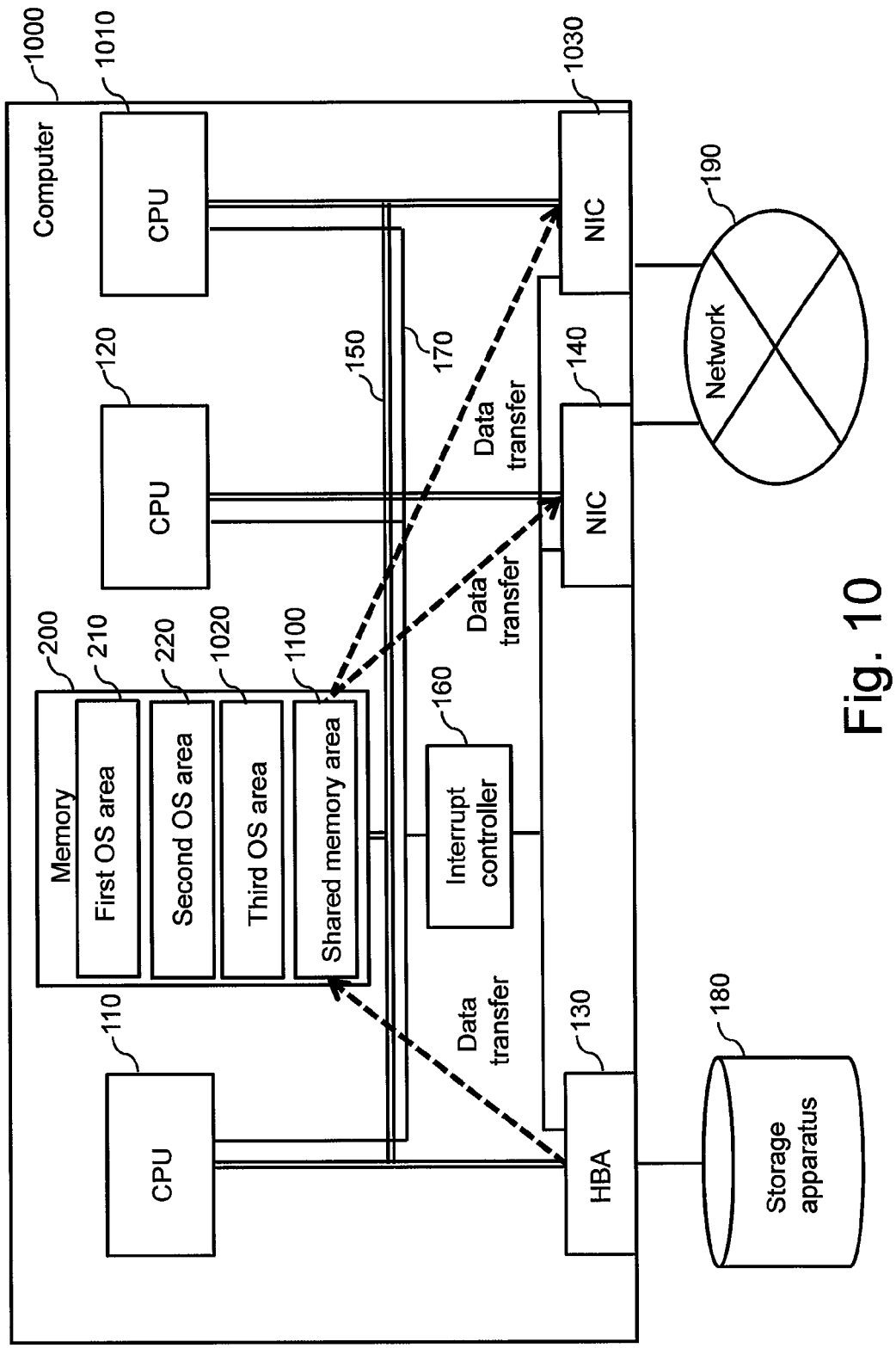
FIG. 10 is a diagram showing a configuration example of the computer system of the second embodiment.

FIG. 10 is a diagram showing a configuration example of the computer system of the second embodiment. Note that the same reference numerals are given to the same configurations as in the first embodiment.

The computer system of the second embodiment includes a computer 1000, a storage apparatus 180, and a network 190.

The computer 1000 comprises, in addition to the configuration of the computer 100 of the first embodiment, a CPU 1010 (example of the second processor in the claims) for executing a third OS, and an NIC 1030 (second I/O device in the claims) for controlling the CPU 1010 which executes the third OS. The CPU 1010 is coupled to the memory 200 and the NIC 1030 via the data bus 150 as with the other CPUs. Moreover, the CPU 1010 is coupled to the interrupt controller 160 via the interrupt signal bus 170.

The memory 200 comprises a first OS area 210, a second OS area 220, a third OS area 1020, and a shared memory area 1100. The third OS area 1020 is configured the same as the second OS area 220. Moreover, the function module configuration of the third OS is configured the same as the second OS 420 (refer to FIG. 4).

The CPU 1010 which executes the third OS distributes to the network 190 (for example, another computer coupled to the network 190), via the NIC 1030, data that was read by the CPU 110 which executes the first OS from the storage apparatus 180 via the HBA 130, as with the CPU 120 which executes the second OS. Consequently, the same data can be sent in parallel to more computers via the network 190.

The CPU 110 which executes the first OS 410 controls the interrupt controller 160 so that the disk I/O complete interrupt generated by the HBA 130 is delivered to both the CPU 120 and the CPU 1010. Consequently, both the second OS executed on the CPU 120 and the third OS executed on the CPU 1010 can detect the completion of the DMA transfer of data from the HBA 130 to the shared memory area 1100.

The CPU 1010 which executes the third OS controls the interrupt controller 160 so that the I/O complete interrupt generated by the NIC 1030 is delivered to the CPU 110 as with the CPU 120 which executes the second OS. Consequently, the CPU 110 which executes the first OS 410 can detect the completion of the DMA transfer of data by the NIC 140 and the NIC 1030, and release the I/O buffer 1140 (refer to FIG. 11) allocated in the shared memory area 1100.

Figure 11:
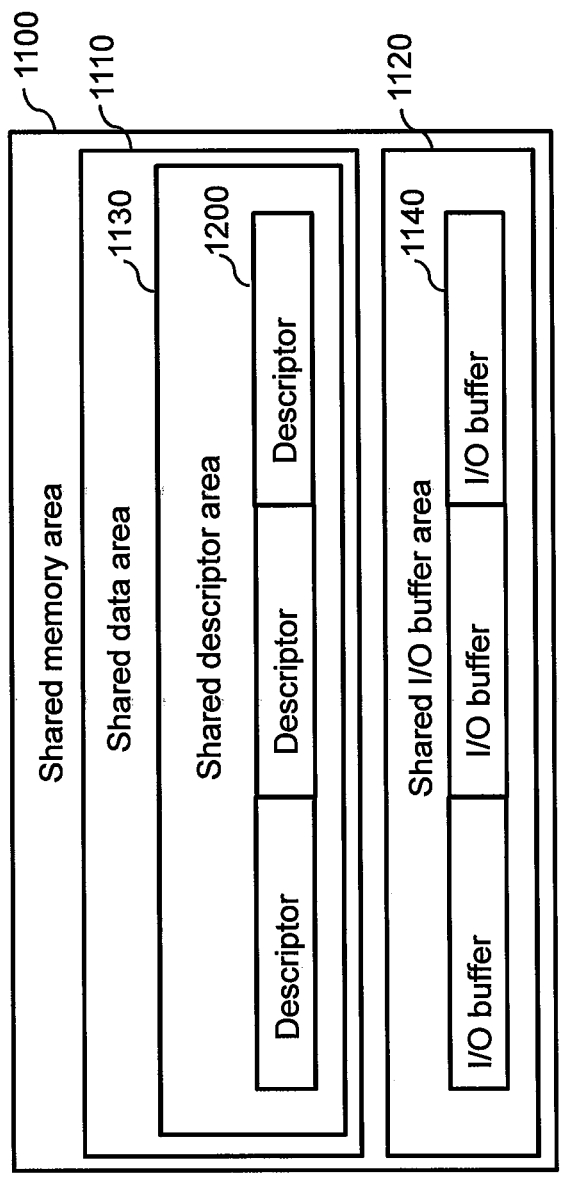
FIG. 11 is a diagram explaining the contents of the shared memory area of the second embodiment.

FIG. 11 is a diagram explaining the contents of the shared memory area of the second embodiment.

The shared memory area 1100 includes a shared data area 1110 and a shared I/O buffer area 1120. The shared data area 1110 comprises a shared descriptor area 1130 for storing one or more descriptors 1200. The shared I/O buffer area 1120 stores one or more I/O buffers 1140. Note that the descriptor or descriptors 1200 and the I/O buffer or buffers 1140 do not necessarily have to correspond one-to-one.

Figure 12:
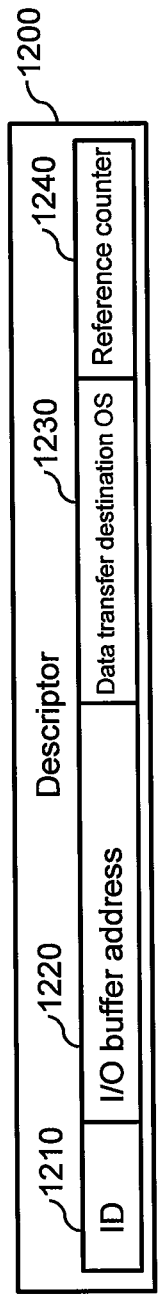
FIG. 12 is a diagram explaining the details of a descriptor of the second embodiment.

FIG. 12 is a diagram explaining the details of a descriptor of the second embodiment.

The descriptor or descriptors 1200 are used by the first OS 410 for managing the allocated I/O buffer 1140. A descriptor 1200 comprises an ID 1210, an I/O buffer address 1220, a data transfer destination OS 1230, and a reference counter 1240. The ID 1210 stores an ID for uniquely identifying a specific descriptor 1200 when a plurality of descriptors 1200 exist. The I/O buffer address 1220 stores the address (address information) of the I/O buffer 1140 storing the data subject to the data transfer. The data transfer destination OS 1230 stores the ID of one or more OSs to use the data stored in the I/O buffer 1140. In this embodiment, the ID (processor specific information) of the CPU which executes the OS to use the data is stored. The reference counter 1240 stores the number of transfer destination OSs (number of transfer destination CPUs: number of second processors) to use the data stored in the I/O buffer 1140 at the start of using the descriptor 1200, and the number is decremented by one each time the use of data by the transfer destination OS is complete.

Accordingly, when the reference counter 1240 becomes 0, since it shows that the processing performed by all OSs (CPUs) using the data is complete, the descriptor 1200 and the I/O buffer 1140 indicated in the I/O buffer address 1220 can be released as being "unused."

Note that, in order to determine whether the number of I/O complete interrupts generated by the NICs 140, 1030 has reached the number of all CPUs using the data, the number of transfer destination OSs is decremented by one each time the use of the data is complete (each time an I/O complete interrupt is received) and whether such number has reached 0 is determined. However, for example, it is also possible to increment the number by one each time the use of the data is complete (each time an I/O complete interrupt is received) and determine whether it coincides with the number of transfer destination OSs. Note that the usage of the descriptor 1200 and the I/O buffer 1140 can be managed by using a bitmap or the like in the shared data area 1110.

In the boot processing of the computer 1000, the third OS is booted subsequent to the second OS boot processing (step S540) in the boot processing of the computer 100 shown in FIG. 5. The service start processing of the third OS is the same as the service start processing of the second OS shown in FIG. 8.

The first OS of the second embodiment additionally sets the interrupt handler unit 414 of the first OS, in the interrupt handler setting processing (step S620) of the first OS boot processing of the first embodiment shown in FIG. 6, so that the first OS additionally processes the interrupt generated by the NIC 1030.

Moreover, the first OS of the second embodiment allocates the I/O buffer 1140 of the shared I/O buffer area 1120 as the I/O buffer to be used for the data transfer from the HBA 130 in the shared I/O buffer allocation processing (step S710) of the operation processing of the inter-OS communication control unit 413 shown in FIG. 7, and additionally sets the descriptor 1200. For example, when transferring data by the CPU 120 and the CPU 1010, the first OS stores the address of the allocated I/O buffer 1140 in the I/O buffer address 1220, stores the IDs of the CPU 120 and the CPU 1010 as the data transfer destination OS 1230, and sets "2" as the reference counter. Moreover, the first OS of the second embodiment receives a plurality of I/O complete interrupts in the I/O complete interrupt wait processing (step S730), and performs processing by using the reference counter 1240 of the corresponding descriptor 1200.

Figure 13:
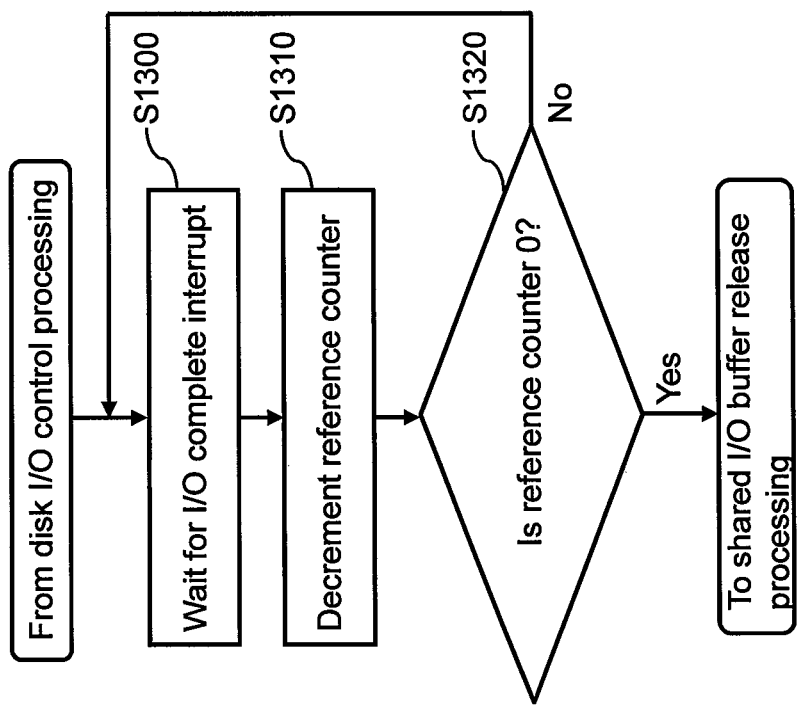
FIG. 13 is a flowchart rendering the I/O complete interrupt wait processing of the first OS of the second embodiment.

FIG. 13 is a flowchart rendering the I/O complete interrupt wait processing of the first OS of the second embodiment.

After the disk I/O control processing (step S720) is complete, the first OS waits for the I/O complete from the NIC 140 or the NIC 1030 via the interrupt controller 160 (step S1300).

Upon receiving the I/O complete interrupt from the NIC 140 or the NIC 1030, the first OS decrements the reference counter 1240 of the corresponding descriptor 1200 by one (step S1310).

Subsequently, the first OS checks whether the reference counter 1240 is 0 (step S1320). If the reference counter 1240 is not 0 (No in step S1320), it determines that there is an OS using the I/O buffer 1140, and returns to the I/O complete interrupt wait processing (step S1300). Meanwhile, if the reference counter 1240 is 0 (Yes in step S1320), it determines that there are no more OSs using the descriptor 1200 and the corresponding I/O buffer 1140, and proceeds to the shared I/O buffer release processing (step S740).

As explained above, with the computer system according to the second embodiment, when data that was read by the CPU 110 which executes the first OS from the storage apparatus 180 via the HBA 130 is to be sent by the CPU 120 which executes the second OS to the network 190 via the NIC 140, or sent by the CPU 1010 which executes the third OS to the network 190 via the NIC 1030, there will be no load or delay in the processing of copying data to the shared memory by the CPU or notifying the completion of the shared memory access between the CPUs.

Although the second embodiment explained a case of comprising two CPUs; namely, the CPU 120 and the CPU 1010 to execute the OS for distributing data to the network 190, the present invention is not limited thereto, and three or more CPUs may be used for executing the OS for distributing data to the network 190, and, according to such a configuration, the scalability of the data distribution service can be improved.

Moreover, in a computer comprising even more HBAs, it is also possible to increase the number of CPUs for executing the OS, such as the first OS, to perform the disk I/O to and from the storage apparatus 180. Furthermore, in the foregoing case, by selectively setting the data transfer destination OS 1230 of the descriptor 1200, the flexibility and scalability of the data distribution service can be further improved.

Moreover, according to this embodiment, it is possible to use, in the same computer, for example, a dedicated real-time OS which specializes in the control of the disk block I/O as the first OS to perform the disk I/O, and a separate real-time OS which specializes in streaming distribution such as packet shaping or the like as the second and third OSs to perform the network I/O, and it is thereby possible to create a computer system and provide services which leverage the respective characteristics.

Example 3

Figure 14:
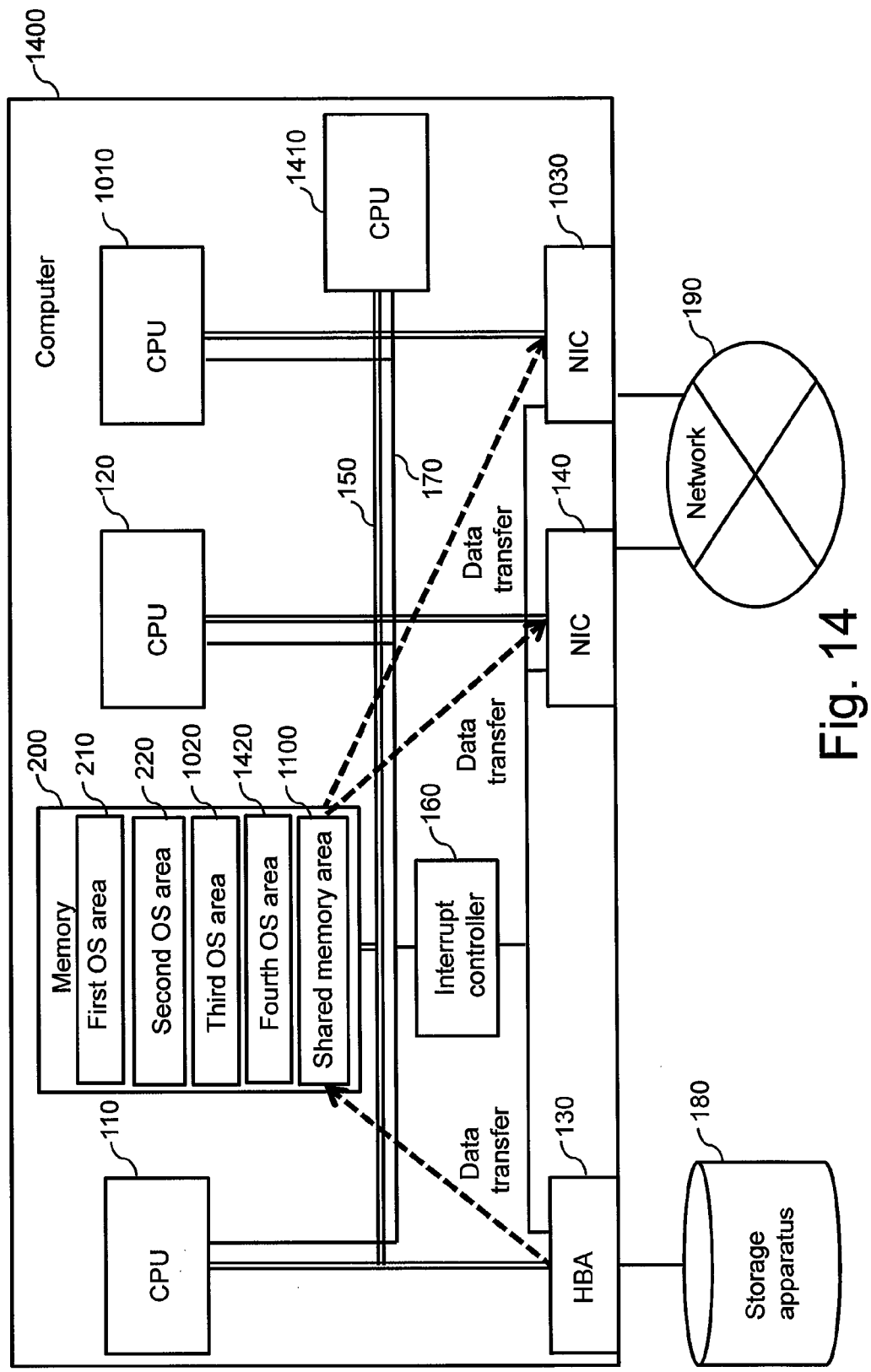
FIG. 14 is a diagram showing a configuration example of the computer system of the third embodiment.

FIG. 14 is a diagram showing a configuration example of the computer system of the third embodiment. Note that the same reference numerals are given to the same configurations as in the first and second embodiments.

The computer system of the third embodiment includes a computer 1400, a storage apparatus 180, and a network 190.

The computer 1400 comprises, in addition to the configuration of the computer 1000 of the second embodiment, a CPU 1410 (example of a monitoring processor) for executing a fourth OS. The CPU 1410 is coupled to the memory 200 via the data bus 150 as with the other CPUs. Moreover, the CPU 1410 is coupled to the interrupt controller 160 via the interrupt signal bus 170. The memory 200 further comprises a fourth OS area 1420. The fourth OS area 1420 is configured the same as the second OS area 220.

Unlike the first OS and the second OS, the fourth OS that is executed by the CPU 1410 does not directly control the I/O device such as the NIC 140. The CPU 1410 which executes the fourth OS controls the interrupt controller 160, and configures a setting so that all I/O complete interrupts are delivered to the CPU 1410. Consequently, the CPU 1410 which executes the fourth OS can monitor the operating conditions of the OS running on the other CPUs based on the generation status of the I/O complete interrupt.

The CPU 1410 which executes the fourth OS accesses the shared memory area 1100 and monitors the usage of the descriptor or descriptors 1200. The fourth OS comprehends the interrupt to be generated by the I/O device such as the NIC 140 by acquiring information of the data transfer destination OS 1230 of the descriptor 1200 that is being used.

When the fourth OS does not receive the I/O complete interrupt from the expected I/O device (that is, I/O device controlled by the CPU which is set as the data transfer destination OS 1230 of the descriptor 1200) within a given timeout period, it determines that the OS for controlling that I/O device is not operating normally. The fourth OS reboots the OS which it determined as not operating normally. For example, if an I/O complete interrupt by the expected NIC 140 is not delivered to the CPU 1410 which executes the fourth OS within a given period of time, the fourth OS determines that the second OS executed on the CPU 120 is not operating normally. The fourth OS delivers a SIPI (Startup IPI) interrupt (reboot interrupt) to the CPU 120 via the interrupt controller 160, and reboots the second OS by causing the CPU 120 to re-execute the initialization processing of the second OS. Here, prior to rebooting the second OS, the fourth OS may use a conventional inter-OS communication function and notify the CPU 110 which executes the first OS that the second OS is not operating normally. Moreover, the fourth OS may also send a block interrupt to the CPU 120 and block the CPU 120 without rebooting the second OS running on the CPU 120.

As explained above, with the computer system of the third embodiment, the fourth OS executed on the CPU 1410 can monitor the operating conditions of the OS running on other CPUs based on the generation status of the I/O complete interrupt, and the OS which is not operating normally can be rebooted or the CPU executing the OS which is not operating normally can be blocked. Thus, according to this embodiment, the reliability and availability of the computer system can be improved.

Embodiments of the present invention were described above, but this invention is not limited to these embodiments, and it goes without saying that it may be variously modified to the extent that such modification does not deviate from the gist of the invention.

For example, although the foregoing embodiments showed an example where the interrupt controller 160 and the I/O devices 130, 140 and the like are configured as separate components, a configuration where the respective I/O devices include the interrupt controller 160; that is, a functional configuration of sending an interrupt to a predetermined processor may also be adopted.

Moreover, although the foregoing embodiments caused the data that was read from the storage apparatus 180 as a result of the CPU 110 controlling the HBA 130 to be sent to the network 190 from the CPU 120, the present invention is not limited thereto, and, for example, the CPU 110 may control the NIC 140 and receive the data from a computer coupled to the network 190, and the CPU 120 may control the HBA 130 and store the received data in the storage apparatus 180.

REFERENCE SIGNS LIST

100 computer
110 CPU
120 CPU
130 HBA
140 NIC
160 interrupt controller
180 storage apparatus
190 network
200 memory
210 first OS area
220 second OS area
230 shared memory area
240 nonvolatile memory area
300 configuration area
310 memory assignment information

The invention claimed is:

1. A computer, comprising:
a first processor for executing a first OS;
a first I/O device capable of inputting and outputting data to and from a first apparatus based on control of the first processor which executes the first OS;
a second processor for executing a second OS;
a second I/O device capable of inputting and outputting data to and from a second apparatus based on control of the second processor which executes the second OS;
a shared memory which is accessible by the first and second processors; and
an interrupt controller for controlling the sending of an I/O complete interrupt to the first processor or the second processor, wherein
the first processor issues a control command for causing the first I/O device to read, from the first apparatus, target data to be sent to the second apparatus and store the target data in the shared memory,
based on the control command, the first I/O device reads the target data from the first apparatus and thereafter transfers the target data to the shared memory, and then generates an I/O complete interrupt,
the interrupt controller delivers the I/O complete interrupt generated by the first I/O device to the second processor,
when the second processor receives the I/O complete interrupt, the second processor issues a control command for causing the second I/O device to read the target data from the shared memory and send the target data to the second apparatus,
based on the control command the second I/O device reads the target data from the shared memory and sends the target data to the second apparatus,
the interrupt controller can be set with a delivery destination of the I/O complete interrupt,
the first processor implements the setting in the interrupt controller so that the I/O complete interrupt generated by the first I/O device is delivered to the second processor,
the second I/O device generates an I/O complete interrupt after sending the target data to the second apparatus,
the interrupt controller delivers the I/O complete interrupt generated by the second I/O device to the first processor,
when the first processor receives the I/O complete interrupt generated by the second I/O device from the interrupt controller, the first processor releases a storage area of the shared memory storing the target data,
the second I/O device sends the target data to the second apparatus in units of packets of a predetermined size, and generates the I/O complete interrupt after completing the sending of the final packet of the target data,
the first I/O device is an HBA (Host Bus Adapter), and transfers the target data to the shared memory based on DMA (Direct Memory Access),
the second I/O device is an NIC (Network Interface Card), and reads the target data from the shared memory based on DMA,
the first apparatus is a storage apparatus for storing data, and
the second apparatus is a computer coupled to a network.

2. A computer, comprising:
a first processor for executing a first OS;
a first I/O device capable of inputting and outputting data to and from a first apparatus based on control of the first processor which executes the first OS;
a second processor for executing a second OS;
a second I/O device capable of inputting and outputting data to and from a second apparatus based on control of the second processor which executes the second OS;
a shared memory which is accessible by the first and second processors; and
an interrupt controller for controlling the sending of an I/O complete interrupt to the first processor or the second processor, wherein
the first processor issues a control command for causing the first I/O device to read, from the first apparatus, target data to be sent to the second apparatus and store the target data in the shared memory,
based on the control command, the first I/O device reads the target data from the first apparatus and thereafter transfers the target data to the shared memory, and then generates an I/O complete interrupt,
the interrupt controller delivers the I/O complete interrupt generated by the first I/O device to the second processor,
when the second processor receives the I/O complete interrupt, the second processor issues a control command for causing the second I/O device to read the target data from the shared memory and send the target data to the second apparatus, based on the control command the second I/O device reads the target data from the shared memory and sends the target data to the second apparatus, the shared memory associates the number of the second processors which control the sending of the target data to a plurality of the second apparatuses with processor specific information capable of identifying the second processor which controls the sending of the target data, and stores a result of the association, the computer further comprises a monitoring processor, wherein the interrupt controller notifies the monitoring processor of the I/O complete interrupts generated by a plurality of the second I/O devices, the monitoring processor identifies the second processor when the I/O complete interrupt is not generated by the second I/O device controlled by the second processor within a predetermined time, and sends a reboot interrupt for rebooting the second OS to the identified second processor, and the second processor reboots the second OS upon receiving the reboot interrupt, and the computer still further comprises a plurality of the second processors and a plurality of the second I/O devices, wherein the shared memory stores the number of the second processors which control the sending of the target data to a plurality of the second apparatuses, and when the number of the I/O complete interrupts generated by the second I/O devices received from the interrupt controller reaches the stored number of the second processors, the first processor releases a storage area of the shared memory storing the target data.

3. The computer according to claim 2, wherein the first processor issues a control command for causing address information showing an address of the storage area of the shared memory storing the target data to be stored in the shared memory, and causing the first I/O device to store the target data in the storage area of the shared memory indicated by the address information, the first I/O device stores the target data in the storage area of the shared memory indicated by the address information, the second processor issues a control command for causing the second I/O device to read the target data from the storage area of the shared memory indicated by the address information, and the second I/O device reads the target data from the storage area of the shared memory indicated by the address information.

4. The computer according to claim 2, wherein the first processor associates the address information with processor specific information capable of identifying the second processor which controls the sending of the target data and then stores the associated information in the shared memory, and the second processor issues a control command for causing the second I/O device to read the target data from the storage area of the shared memory indicated by the address information which is associated with the processor specific information identifying that second processor.

5. The computer according to claim 2, wherein when the I/O complete interrupt is not generated by the second I/O device controlled by the second processor within a predetermined time, the monitoring processor sends a notification to the first processor to the effect that the identified second processor has not sent the target data.

6. The computer according to claim 2, wherein the monitoring processor sends a block interrupt for blocking the second processor instead of the reboot interrupt to the identified second processor, and the second processor blocks itself upon receiving the block interrupt.

7. A computer system, comprising:

a storage apparatus for storing data; and a computer including a first processor for executing a first OS, a first I/O device capable of inputting and outputting data to and from the storage apparatus based on control of the first processor which executes the first OS, a second processor for executing a second OS, a second I/O device capable of inputting and outputting data to and from an external apparatus based on control of the second processor which executes the second OS, a shared memory which is accessible by the first and second processors, and an interrupt controller for controlling the sending of an I/O complete interrupt to the first processor or the second processor, wherein the first processor issues a control command for causing the first I/O device to read, from the storage apparatus, target data to be sent to the external apparatus and store the target data in the shared memory, based on the control command the first I/O device reads the target data from the storage apparatus and thereafter transfers the target data to the shared memory, and then generates an I/O complete interrupt, the interrupt controller delivers the I/O complete interrupt generated by the first I/O device to the second processor, when the second processor receives the I/O complete interrupt, the second processor issues a control command for causing the second I/O device to read the target data from the shared memory and send the target data to the external apparatus, the second I/O device reads the target data from the shared memory and sends the target data to the external apparatus based on the control command, the interrupt controller can be set with a delivery destination of the I/O complete interrupt, the first processor implements the setting in the interrupt controller so that the I/O complete interrupt generated by the first I/O device is delivered to the second processor, the second I/O device generates an I/O complete interrupt after sending the target data to the external apparatus, the interrupt controller delivers the I/O complete interrupt generated by the second I/O device to the first processor, when the first processor receives the I/O complete interrupt generated by the second I/O device from the interrupt controller, the first processor releases a storage area of the shared memory storing the target data, the second I/O device sends the target data to the external apparatus in units of packets of a predetermined size, and generates the I/O complete interrupt after completing the sending of the final packet of the target data, the first I/O device is an HBA (Host Bus Adapter), and transfers the target data to the shared memory based on DMA (Direct Memory Access), the second I/O device is an NIC (Network Interface Card), and reads the target data from the shared memory based on DMA, the first apparatus is a storage apparatus for storing data, and the external apparatus is a computer coupled to a network.

8. A data communication method for a computer including:

a first processor for executing a first OS, a first I/O device capable of inputting and outputting data to and from a first apparatus based on control of the first processor which executes the first OS, a second processor for executing a second OS, a second I/O device capable of inputting and outputting data to and from a second apparatus based on control of the second processor which executes the second OS, a shared memory which is accessible by the first and second processors, and an interrupt controller for controlling the sending of an I/O complete interrupt to the first processor or the second processor, wherein the data communication method comprises:

causing the first processor to issue a control command for causing the first I/O device to read, from the first apparatus, target data to be sent to the second apparatus and store the target data in the shared memory;

causing the first I/O device to read the target data from the first apparatus and thereafter transfer the target data to the shared memory based on the control command, and then generate an I/O complete interrupt;

causing the interrupt controller to deliver the I/O complete interrupt generated by the first I/O device to the second processor;

causing, when the second processor receives the I/O complete interrupt, the second processor to issue a control command for causing the second I/O device to read the target data from the shared memory and send the target data to the second apparatus;

causing the second I/O device to read the target data from the shared memory and send the target data to the second apparatus based on the control command, wherein the interrupt controller can be set with a delivery destination of the I/O complete interrupt;

implementing, by the first processor, the setting in the interrupt controller so that the I/O complete interrupt generated by the first I/O device is delivered to the second processor;

generating, by the second I/O device, an I/O complete interrupt after sending the target data to the second apparatus;

delivering, by the interrupt controller, the I/O complete interrupt generated by the second I/O device to the first processor;

releasing, by the first processor, when the first processor receives the I/O complete interrupt generated by the second I/O device from the interrupt controller, a storage area of the shared memory storing the target data; and sending, by the second I/O device, the target data to the second apparatus in units of packets of a predetermined size, and generates the I/O complete interrupt after completing the sending of the final packet of the target data, wherein the first I/O device is an HBA (Host Bus Adapter), and transfers the target data to the shared memory based on DMA (Direct Memory Access), the second I/O device is an NIC (Network Interface Card), and reads the target data from the shared memory based on DMA, the first apparatus is a storage apparatus for storing data, and the second apparatus is a computer coupled to a network.

* * * * *